Feb. 2, 1954    A. R. STOBB    2,667,909
AUTOMATIC BOOK CASEMAKING MACHINE
Filed July 16, 1952    7 Sheets-Sheet 1

INVENTOR.
ANTON R. STOBB

BY
ATTORNEYS

Feb. 2, 1954 — A. R. STOBB — 2,667,909
AUTOMATIC BOOK CASEMAKING MACHINE
Filed July 16, 1952 — 7 Sheets-Sheet 3

INVENTOR.
ANTON R. STOBB
BY
Byerly, Townsend
& Watson
ATTORNEYS

Patented Feb. 2, 1954

2,667,909

UNITED STATES PATENT OFFICE 2,667,909

AUTOMATIC BOOK CASEMAKING MACHINE

Anton R. Stobb, Union Township, Hunterdon County, N. J., assignor to Western Printing and Lithographing Company, Racine, Wis., a corporation of Wisconsin Application July 16, 1952, Serial No. 299,187

17 Claims. (Cl. 154—1.8)

This invention relates to the making of hard covers or cases for books, more particularly to the type of case which comprises an outside covering of paper or cloth adhesively secured to pieces of stiff cardboard forming a hard reinforcing core around the edges of which the marginal portions of the covering are folded.

In machines heretofore known and now used for making cases for books the elements of the cases are brought together and operations performed thereon in a series of reciprocating motions, case elements often remaining stationary while the machine operates on them. The nearest approach of which I am aware to more or less continuous production is a machine which makes cases from components supplied in web form moving continuously through part of the operations. But even in this machine the partly made cases are caused to change direction which, of course, necessitates their stopping and thus imposing limitations on speed.

While all of these prior machines are a great improvement over hand assembly methods they are still lacking in the speed of production which has long been desired. The present invention achieves a rate of production which is about five times that of the best machines presently being used. This greatly increased production is achieved by bringing case elements together and performing the required pasting and edge folding operations while the elements are all in continuous motion at a uniform speed and without any change in direction, once the elements have been brought together, and even the assembling operation is performed on a continuous basis.

While I prefer to supply the case making machine with precut covering and core elements, the function of the present invention being their assembly and finishing, it is to be understood that the machine hereinafter described may be combined with additional apparatus which forms one or more of the elements and supplies them continuously to the assembling and finishing mechanism.

The principal object of the invention, therefore, is to provide an improved machine by which such cases may be made with greatly increased speed and hence more economically. Other objects and advantages will in part be pointed out in and in part will be obvious from the ensuing description.

The invention will be illustrated by describing its present preferred embodiment in a machine which assembles a case consisting of two pieces of cardboard which stiffen the front and rear covers of the book, a narrower strip of cardboard which stiffens the back of the book and a paper cover which overlies all three of said cardboard pieces and is folded around the edges thereof on four sides. Obviously the back reinforcement may be omitted, as in the case of very thin books.

Essentially the machine, as illustrated, consists of means for delivering preformed cardboard core sets to a continuously moving conveyor system having two main parts, in the first of which the pre-glued and precut cover material is applied to the core set and folded around its front and rear edges and in the second of which the side edges are folded over, the completed case then being delivered from the second conveyor to finishing rolls from which it emerges as a finished product. As an adjunct to the conveyor system aforesaid is related apparatus for continuously and automatically feeding, gluing and delivering the cover sheets to the core sets in timed relationship as they move along the first part of the conveyor system.

The invention will best be understood from a consideration of the following description of a machine which illustrates the best mode of applying the novel principles which I have devised, taken in conjunction with the drawings, in which:

Fig. 23 is an end elevation of the core element guides and related parts, taken on the line 23—23 of Fig. 9;

Figures 1, 2, 3, 4, 5, 6, 7:
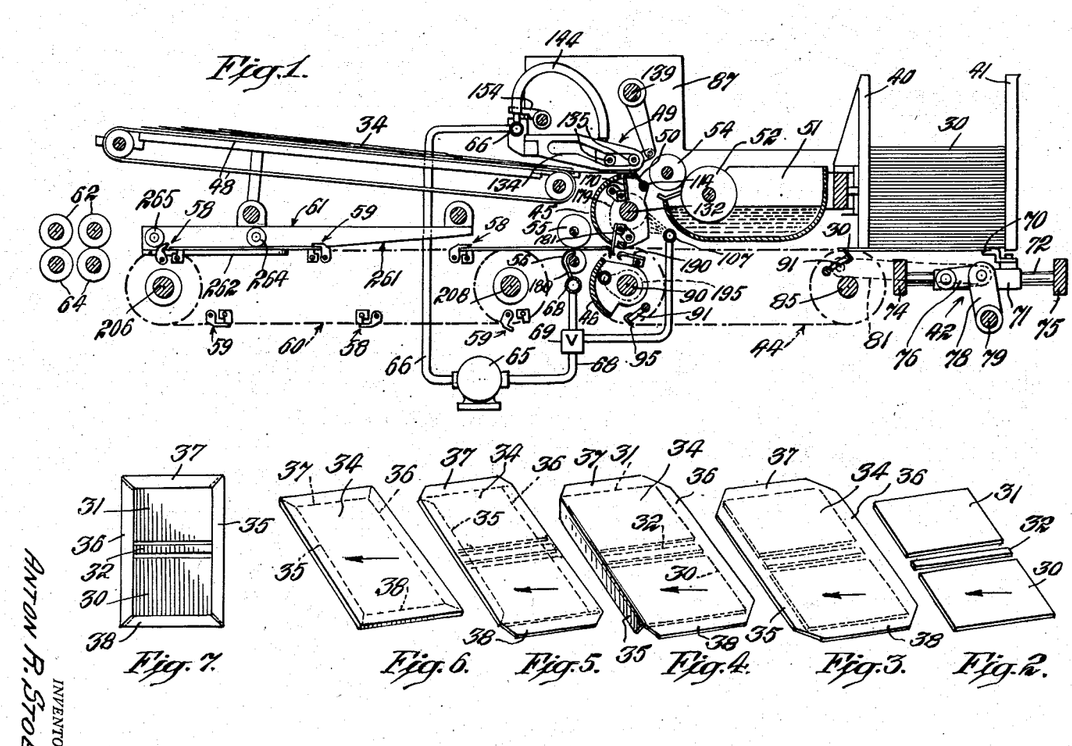
Fig. 1 is a diagrammatic illustration of a complete case making machine as seen in elevation.
Fig. 2 shows a set of core elements for a case.
Fig. 3 shows the covering as first applied to the core elements with overlapping marginal portions.
Fig. 4 shows the front edge of the covering folded down.
Fig. 5 shows the front edge folded down and under and the rear edge folded down.
Fig. 6 shows the completed case as seen from the outside with all of the marginal portions of the covering folded around the edges of the core elements.
Fig. 7 shows a completed case as seen from the inside.

The case or cover for a book, which is the product made by the machine herein described, is illustrated in Figs. 2 through 7 showing the various stages of production in the sequence indicated by the arrows. Fig. 2 shows the core elements which are pieces of stiff cardboard or the like, 30 being, for example the front cover, 31 the rear cover and 32 the back strip, spaced as they would be in moving through the machine. On these core elements is placed a covering 34 which may be a sheet of cloth or paper, printed and precut to the desired size and shape with its corners cut as shown in Fig. 3, the covering having marginal portions which extend on all four sides of the core elements. Fig. 4 shows the front marginal portion 35 folded down. Fig. 5 shows this portion further folded up against the underside of the core elements and the rear marginal portion 36 folded down. In Fig. 6 the rear marginal portion has been further folded up under the core elements, and the two side marginal portions 37 and 38 have been folded around the edges of the core elements. Fig. 7 shows the finished case as seen from the inside. It will be observed that the side marginal portions 37, 38 slightly overlap the front and rear marginal portions 35 and 36, as is preferable. The covering 34 is secured to the core elements by an adhesive of such consistency that the folded over marginal portions of the covering adhere firmly to the core elements as soon as these parts are brought together.

The machine, diagrammatically illustrated in Fig. 1, comprises parts which may be conveniently grouped for description. The first group, which is at the right of the figure, includes hoppers comprising corner guides 40, 41 between which the core elements are stacked, and pushing mechanism, generally indicated at 42, which feeds core elements from the bottoms of the hoppers to an endless conveyor system, generally indicated at 44, which carries the core elements forward to a pair of continuously rotating cylindrical segments 45 and 46. The upper segment 45 embodies gripper mechanism and front and rear edge folding mechanism which acts on the front and rear edges 34 and 35 of the cover. The lower segment 46 embodies a tail sweep plate which operates on the downwardly folded rear marginal portion 36 to fold it against the undersides of the core elements.

The next group includes the means for supplying the covering sheets 34 to the upper cylindrical segment 45 and comprises automatic feeding apparatus including an endless conveyor 48, on which a supply of precut sheets of covering 34 is maintained by an operator, from which they are taken in timed relationship with the other elements of the machine by sucker transfer mechanism, generally indicated at 49, and fed to the grippers 50 of upper segment 45, which applies them to the advancing core elements. The covering sheets thus move first from left to right and then down onto the core elements, thence moving with them from right to left.

As the covering sheets are transferred from conveyor 48 to the core elements, they are coated with fluid adhesive taken from a reservoir 51 by a roller 52 and applied to a coating roller 54 which bears against the outer face of a covering sheet 34 as segment 45 rotates clockwise. Segments 45 and 46, being geared together, rotate in opposite directions and feed the elements of the case forwardly, or to the left, as they perform various operations on them. From said segments the case elements, with their front and rear marginal portions folded, pass through a pair of pressure rollers 55 and 56 which roll the folded marginal portions tight.

Emerging from rollers 55 and 56, the partly completed cases are taken between front edge grippers generally designated 58 and rear edge grippers, generally designated 59, of which there are three sets, carried by an endless conveyor generally indicated at 60. Moving forwardly with this conveyor, the case elements pass between a pair of stationary formers, generally designated 61, which fold, first down and then under, the side marginal portions 37 and 38, after which the cases pass between two pairs of final pressing rollers consisting of the upper rollers 62 and the lower rollers 64, from which the case is discharged as a finished product.

The two conveyors 44 and 60 run continuously, together with the segments 45 and 46, at a uniform speed and the assembling and gluing and the front, back and side folding operations are all performed while the case is in uninterrupted continuous motion, which enables the speed of production to be increased many times over the rate of present machines.

Associated with the foregoing mechanism is a pneumatic system having a pump 65 which creates suction in the line 66 for use in the sucker transfer mechanism 49 and creates pressure in the line 68 to provide air blasts for purposes hereinafter described. The valve 69 is provided to automatically produce the air blasts at the proper time.

*Core delivery and covering application*

Figures 9, 25:
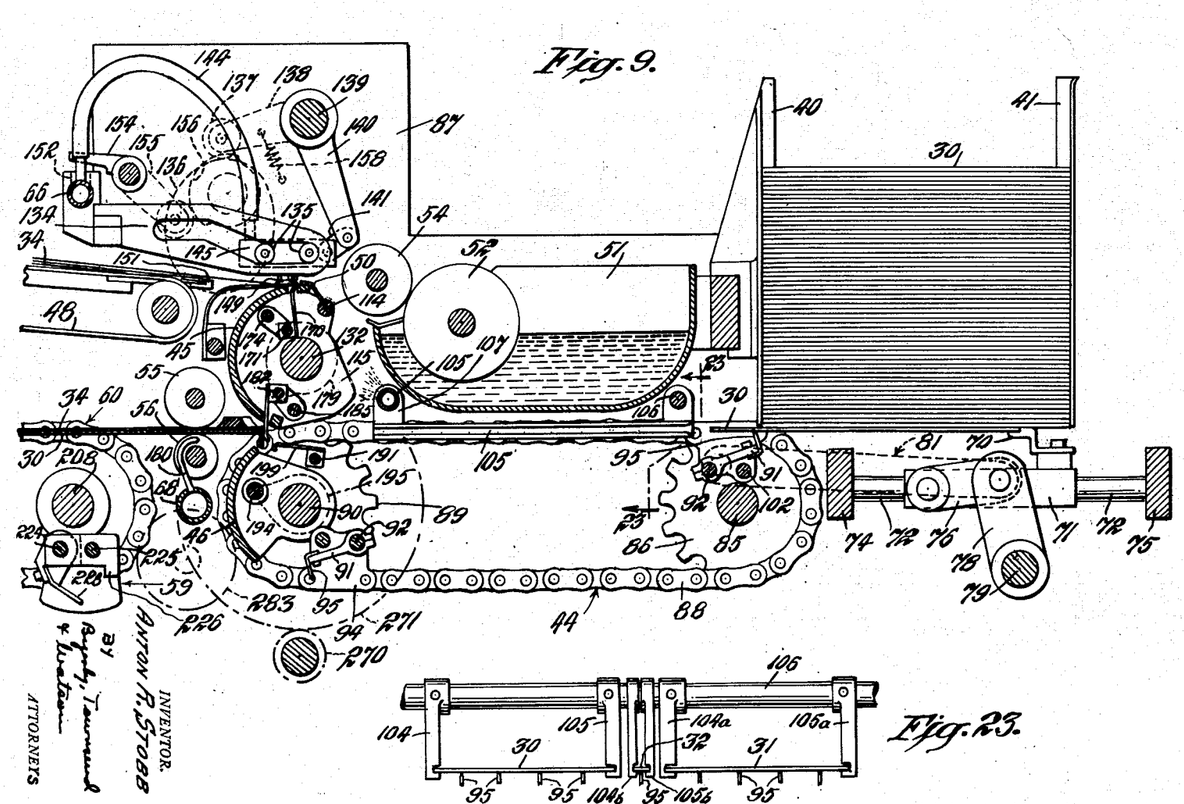
Fig. 25 is a detailed end elevation of guide means and hold down bars for a core element taken on the line 25—25 of Fig. 24.

Referring to Fig. 9, the pieces of precut cardboard or core elements 30, for example, are stacked between the guides 40 and 41, which may be kept filled by an operator while the machine is running. As may be seen in Fig. 11 there are three sets of such guides, 40 and 41 for the front covers 30, 40a and 41a for the rear covers 31, and 40b and 41b for the back strips 32. There are slots at the bottoms of the forward ends of these hoppers to permit single pieces of cardboard to be moved forwardly from the bottoms of the piles by reciprocating pushers 70 which, during each stroke, move behind the piles and engage the rear edges of single boards. All of the pushers are adjustably mounted on a reciprocating table 71 which is slidably supported at opposite ends on rods 72 mounted between a pair of frame members 74 and 75. Table 71 is connected at each end by links 76 to crank arms 78 fast on a shaft 79 which is rocked through a crank arm 80 by a connecting rod 81 driven by pin 82 on disc 84 fast on shaft 85.

Figures 11, 24:
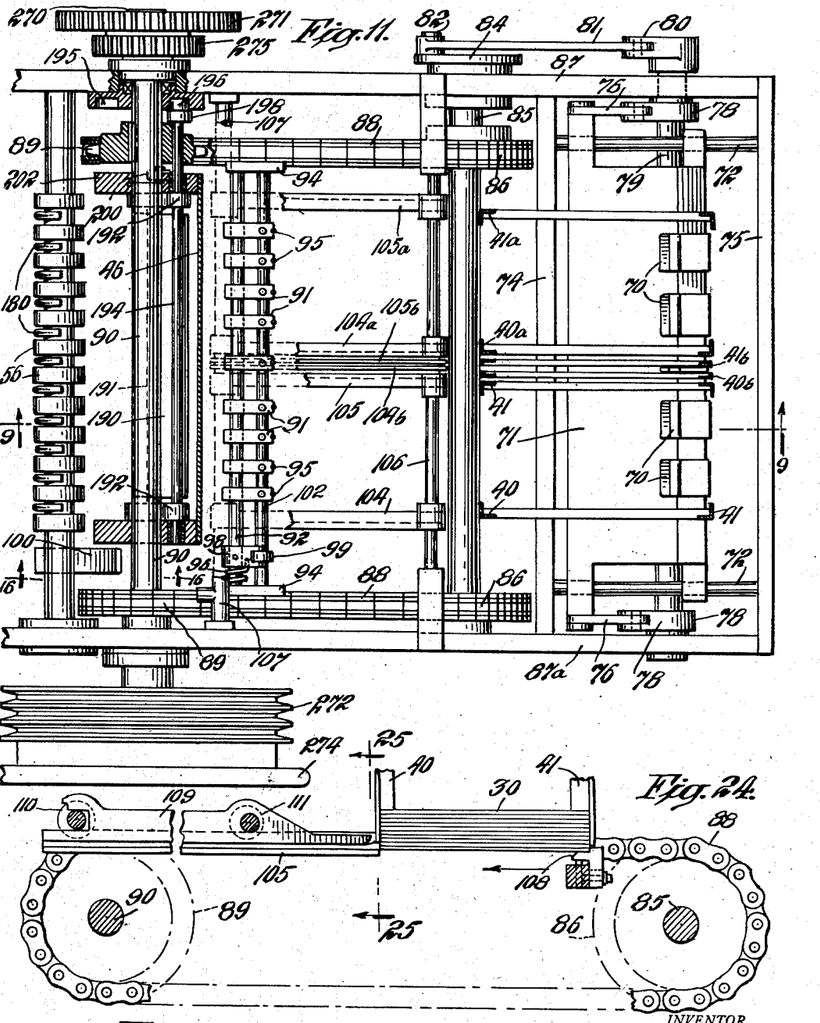
Fig. 24 is a side elevation of modified core element feeding means.
Figure 12:
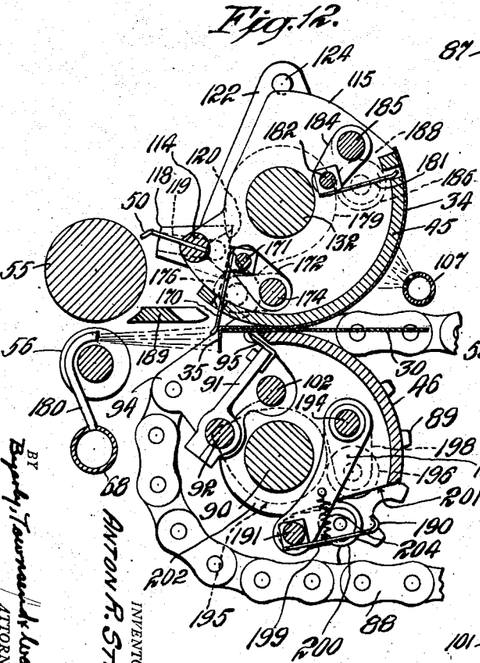
Fig. 12 is a sectional elevation through the cylindrical segments and certain closely related parts, showing the partially completed case in the position in which the front edge of its covering has just been folded downwardly.

Referring to Figs. 9, 11, 12 and 13, shaft 85 carries at each side, inside of the supporting frame members 87 and 87a, sprockets 86 on which are mounted endless roller chains 88 which pass over a second pair of sprockets 89 on a shaft 90, which is the shaft on which the lower cylindrical segment 46 is mounted. The chains 88 carry two spaced apart sets of pin arms 91 (Fig. 9) arranged as shown in Fig. 11 (which shows only one set) on a rod 92 rotatably supported in a pair of end plates 94 attached to the chains 88 so that the pins 95 of arms 91 engage the undersides of the core elements as they are pushed forward by the pushers 70 to carry them along with the chains 88. Pin arms 91 are urged toward the core elements, such as 30, by a coil spring 96 (Figs. 11 and 16) which tends to rotate shaft 92 counter-clockwise and they engage the core elements as the pin arms move upwardly around sprockets 86, which move counter-clockwise. To disengage the pins, rod 92 carries a rocker arm 98 having a roller 99 which engages the stationary cam 100 just as the arms 91 start to move downwardly around the forward sprockets 89. This cam is attached to a fixed support 101. When the pins are withdrawn from the core elements they have been gripped between the segments 45 and 46, as shown in Fig. 12. The rod 102 which parallels rod 92 is securely fixed to the end plates 94 and with them provides the moving support for rod 92.

As the core elements move forwardly from their hoppers in engagement with the pins 95 they enter sets of edge guides 104, 105 and 104a, 105a and 104b, 105b, best shown in Fig. 23, which are supported from a cross-shaft 106 and a tubular shaft 107 (Fig. 9) which also serves as a pipe in the pneumatic system. It is perforated so as to direct a blast of air toward segment 45 for the purpose of maintaining the covering sheets 34 in contact therewith as it rotates. (See Fig. 12.) This air blast may be continuous or valved to be intermittent, as may be desired.

Figs. 24 and 25 show a modified form of core element delivery in which, instead of carrying pin arms, chain 88 carries pushers 108, eliminating the necessity for the separate pushers 70 and their operating mechanism. The pushers move the core elements such as 30 directly into the edge guides and to hold the boards down against the pushers 108, in case they have a tendency to warp, hold-down bars 109 are supported above the boards adjacent the pushers. The vertical position of these bars may be adjusted by means of suitable eccentric mountings 110 and 111.

Figures 13, 14, 15, 16:
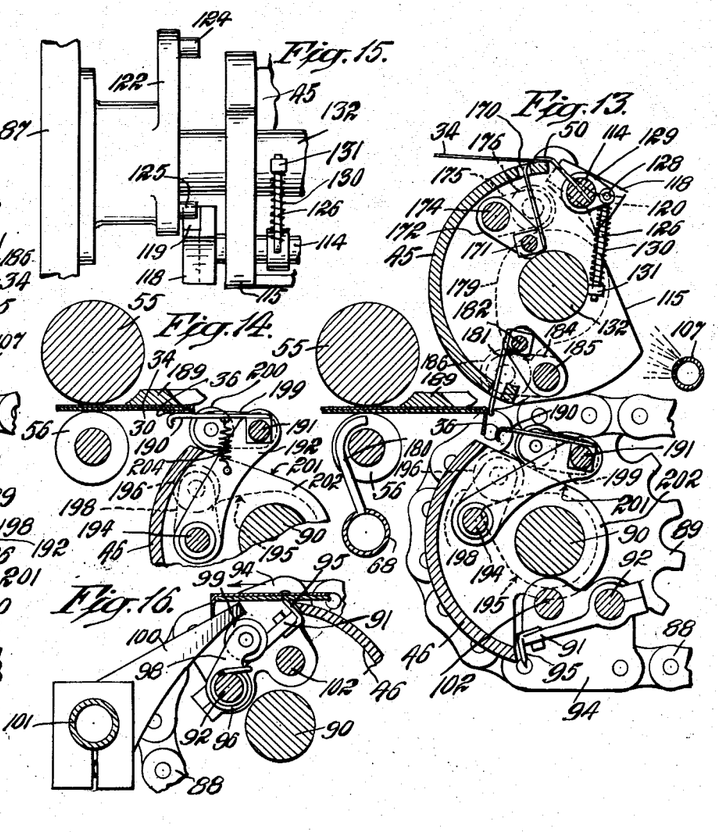
Fig. 13 is a similar view showing the parts moved to the position in which the rear edge of the covering has just been folded downwardly.
Fig. 14 is a similar fragmentary view showing some of the parts of Fig. 13 after they have moved to the position in which the rear marginal portion of the covering has been folded upwardly against the core elements by the tail sweep plate.
Fig. 15 is a detailed elevation showing the means for actuating the covering gripper mechanism of the upper cylindrical segment.
Fig. 16 is a sectional elevation, taken on the line 16—16 of Fig. 11, showing the means for extracting the conveyor pins from the core elements.

Referring to Figs. 12, 13 and 15, the upper cylindrical segment 45 carries, on the rotatable shaft 114 which is mounted between its end plates 115 and 116, the grippers 50 which are in the form of a series of thin spring wires so as to cover a minimum of the gripped marginal portion of the covering 34, which must be coated with glue. Shaft 114 extends through end plate 115 and carries on its outer end a tumbler 118 which has in its outer face a slot 119 flared at one end as shown at 120. Supported in fixed position on side frame member 87 of the machine is an arm 122 carrying an upper pin 124 and a lower pin 125 which, as the segment 45 rotates, engage opposite ends of the slot in tumbler 118 in known manner to rock it so as to move the grippers 50 from open to closed position and vice versa at the proper times. Mounted internally of segment 45 near its end 115 is an overcentering spring device which holds the grippers either in open or closed position. This device consists of a rod 126 pivoted at 128 to a short arm 129 fixed on shaft 114. Rod 126 is surrounded by a compression spring 130 and its free end slides in a perforated lug 131 on the rotating shaft 132 which supports upper segment 45. Fig. 13 shows grippers 50 just after they have closed and Fig. 12 shows them in partially opened position. It will be understood that the grippers bear against the leading edges of the covering sheets 34, holding them against the forwardly moving edge of the segment 45, closing in timed relation to their delivery by the sucker transfer mechanism 49 (Fig. 1).

Figure 26:
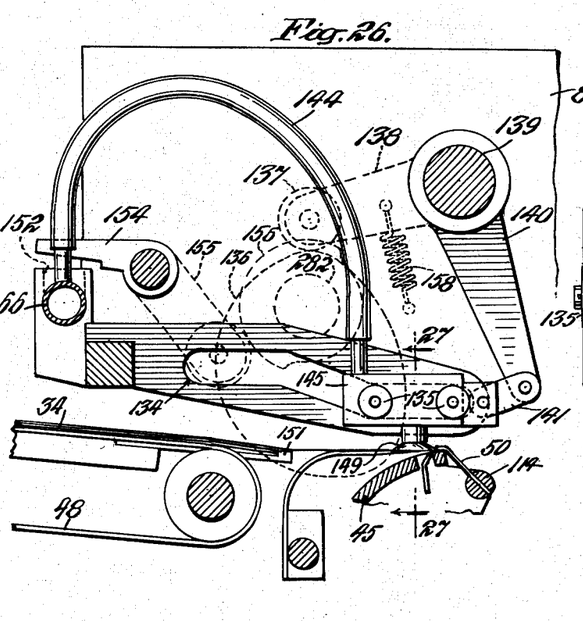
Fig. 26 is an enlarged elevation of reciprocating sucker mechanism for feeding covering sheets to the upper cylindrical segment.
Figure 27:
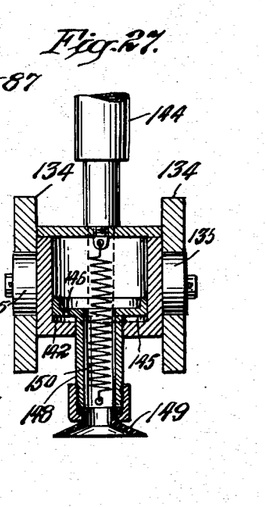
Fig. 27 is a sectional elevation through a portion of the sucker mechanism taken on line 27—27 of Fig. 26.

Figs. 26 and 27 show a suitable type of transfer mechanism for the covering sheets 34, the construction of which is not in itself part of the invention. It is of the differential sucker type and is actuated in timed relation to the other parts of the machine to deliver cover sheets 34 to the grippers of upper segments 45 as they reach their uppermost position. Supported above the endless conveyor 48 are a pair of curved tracks 134 in which the sucker mechanism moves to and fro on rollers 135. Movement is produced by means of a rotating cam 136 acting on the roller 137 attached to crank arm 138 which rocks shaft 139 and moves arm 140 which is connected by link 141 to the sucker mechanism. The latter is shown in central sectional elevation in Fig. 27 and consists of a closed cylinder 142 which is connected at the bottom to the vacuum line 66 by flexible tubing 144. Operating in cylinder 142 is a piston 145 which has a small vent 146, the piston being connected with downwardly extending tube 148 carrying the sucker disc 149, the latter being in communication with the inside of the cylinder. The piston is normally urged upwardly by a spring 150. When a partial vacuum is produced in the cylinder below the piston it moves downwardly, extending the spring and bringing the sucker 149 into contact with the top covering sheet 34 at which time the sucker will be positioned over the end of a sheet which abuts the stop 151 associated with conveyor 48. Rotation of cam 136 causes the sucker to move to the right, as shown in Fig. 26, and, as it approaches the limit of its movement in this direction, a vent 152 is opened by movement of the closure member 154 which is actuated through arm 155 by cam 156. The opening of this vent opens line 66 and releases the suction on piston 145. The spring 150 raises sucker 149 which simultaneously lets go of the paper. The sucker then returns to the left to take up the next sheet and as it does so vent 152 is closed. Arm 138 is held in contact with cam 136 by the tension spring 158 and in a similar fashion arm 155 may be held in contact with cam 156.

Covering sheets 34 are delivered to the upper segment 45 and taken by the grippers 50 with the segments in the position shown in Fig. 13. These segments rotating continuously, the covering is carried around clockwise in contact with roller 54 (Fig. 9) and in its travel is coated with adhesive. The air blast directed from perforated pipe 107 toward the face of segment 45 presses the covering against it. The adhesively coated covering is laid on the advancing core elements, the timing being such that the front and rear marginal portions 35 and 36 of the covering overhang the front and rear edges of the core elements by the desired amounts, as shown in Fig. 3.

*Front and rear edge folding*

Upper cylindrical segment 45 carries a front edge folding plate 170 which is mounted on a shaft 171 rotatably supported in arms 172 fixed to a rock shaft 174. This shaft extends through an end plate of the segment and carries on the outside thereof an arm 175 having a cam-following roller 176 which engages a stationary cam 179. This is preferably a groove cam but only its inner face is outlined. The cam groove is so formed as to cause the front edge folding plate 170 to emerge at the proper time through an opening near the leading edge of segment 45 to push downwardly the front marginal portion 35 of the covering, as shown in Fig. 12. Having performed this function plate 170 is immediately retracted and marginal portion 35 is caught by a timed air blast emitted from a series of pipes 180 extending through grooves in the lower feed roller 56. The case elements traveling forwardly in this air stream, portion 35 tends to be blown up toward the underside of the core elements as it enters between rollers 55 and 56 which press the covering firmly around the advancing edge of said elements.

A similarly constructed rear edge folding plate 181 is mounted near the other end of segment 45 on shaft 182 carried by arms 184 fixed on shaft 185, which is rocked by cam roller 186 on arm 188. The same cam 179 actuates both folding plates. As the rear edge of the core elements emerges from between segments 45 and 46, plate 181 acts to push the rear marginal portion 36 downwardly as shown in Fig. 13. At this time the case is moving under a fixed plate 189, slotted, as shown, to permit passage of the folding plates.

Immediately a tail sweep plate 190 carried by lower segment 46 moves forwardly with a quick jab and pushes the rear marginal portion 36 of the covering up against the underside of the core elements as may be seen by comparing Figs. 13 and 14. This motion is accomplished by mounting the tail sweep plate 190 on a shaft 191 carried on links 192 fixed to shaft 194 which is rocked by a fixed cam 195 acting on a roller 196 on an arm 198. Attached to the sweep plate shaft 191 is another arm 199 carrying a roller 200 which rides along the flat face 201 of the end plate 202 of lower segment 46. Except when it is caused to emerge and tuck under the marginal portion 36, the sweep plate is held in retracted position as shown in Figs. 12 and 13 by means of a spring 204. Having been completely folded into the position shown in Fig. 14, the rear marginal portion of the covering 34 is firmly pressed against the core elements as it passes between rollers 55 and 56. The front and rear edges of the case, which will be the bottom and top edges of the book, are now finished and the case moves to the second conveyor shown in Figs. 8 and 10.

*Side edge folding and finishing*

Figures 8, 21, 22:
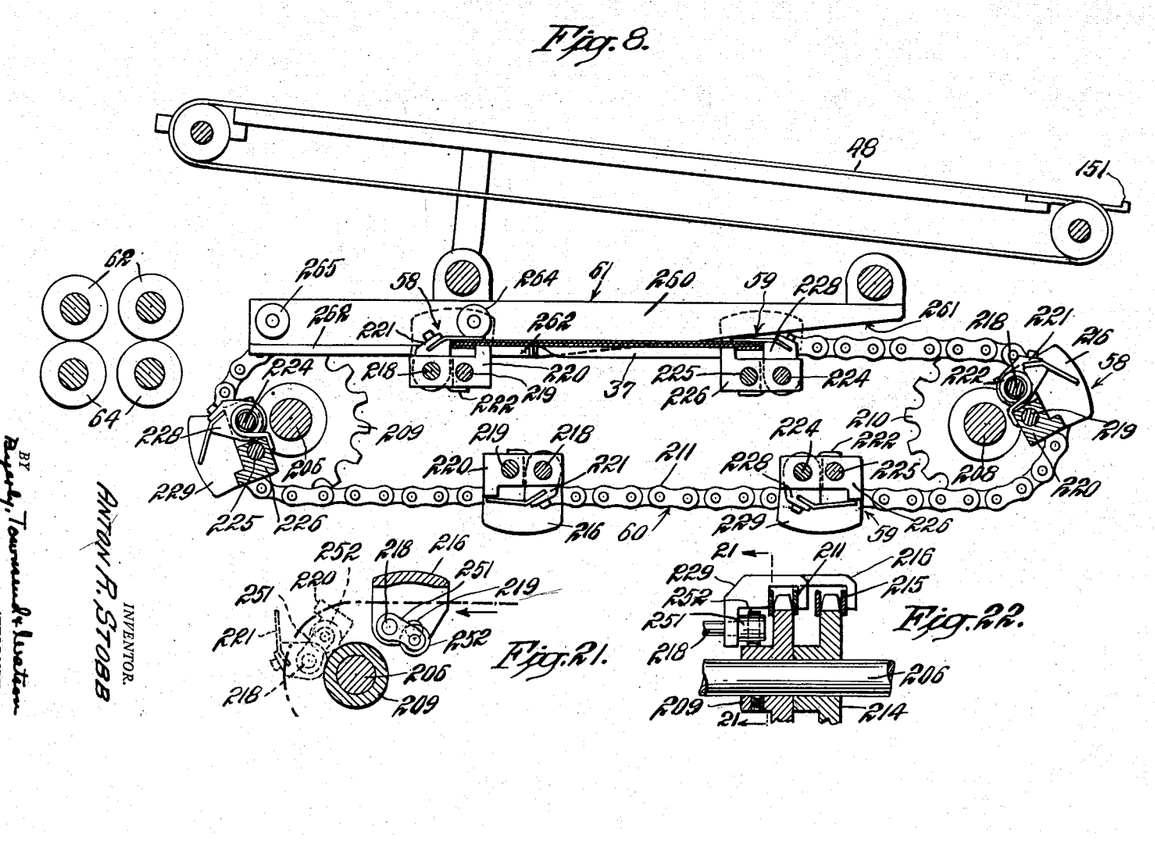
Figs. 8 and 9, taken together, are a longitudinal elevation of the principal parts of the machine taken respectively on the lines 8—8 of Fig. 10 and 9—9 of Fig. 11.
Fig. 21 is a sectional elevation, taken on the line 21—21 of Fig. 22, showing part of the front edge gripper mechanism with particular reference to the means for opening the gripper at the proper time.
Fig. 22 is a fragmentary sectional elevation of one pair of chain sprockets and associated gripper mechanism showing how the sprocket hub acts to open the gripper.
Figure 10:
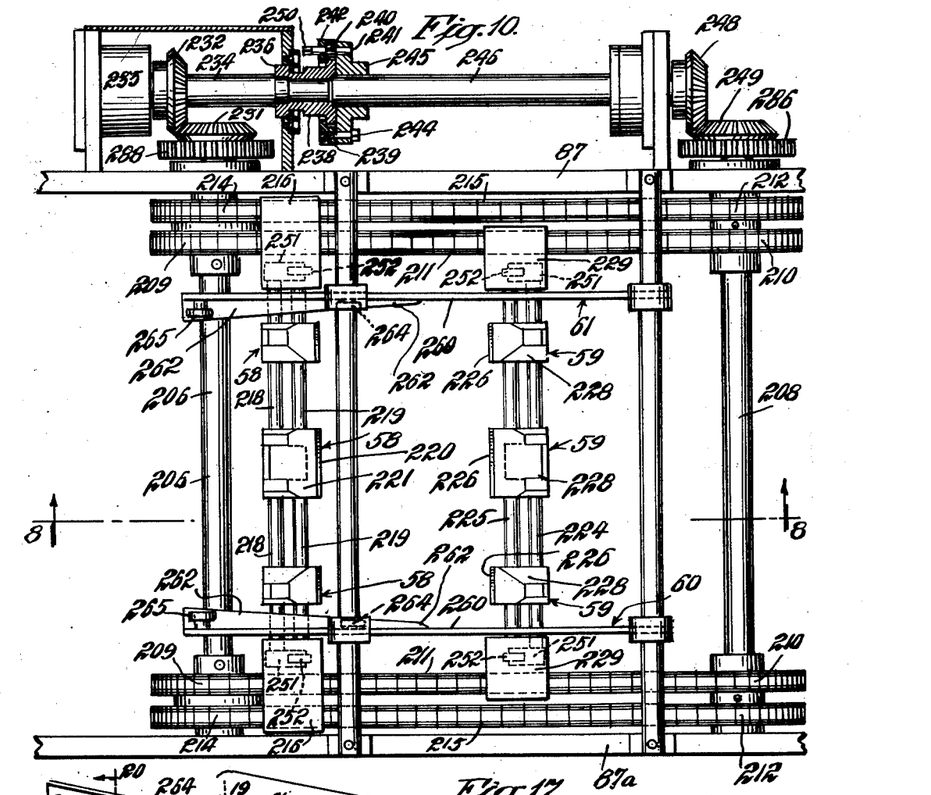
Figs. 10 and 11, taken together, are a top plan view of the machine, with some parts omitted, taken for the most part on a line just above the plane in which the cases travel during their assembly.

Referring to Figs. 8 and 10, the second conveyor system (generally designated 60 in Fig. 1) comprises two driven shafts, the front shaft 206 and the rear shaft 208. On the front shaft are two driven sprockets 209 and on the rear shaft 208 two idler sprockets 210, these sprockets carrying the pair of inner roller chains 211. On the rear shaft 208 are two driven sprockets 212 and on the front shaft two idler sprockets 214, these sprockets carrying the outer roller chains 215. The front edge gripper mechanism comprises the yokes 216 which are attached to the outer chains 215 and are so shaped as to clear the inner chains 211. These yokes carry two parallel shafts 218 and 219 carrying the fixed grippers 220 and the movable grippers 221 which are urged toward the fixed grippers by springs 222. The rear edge grippers are similarly constructed but face in the opposite direction and are mounted on the shafts 224 and 225 carrying the fixed grippers 226 and the movable grippers 228. The rear gripper shafts are supported in yokes 229 attached to inner chains 211 (see Fig. 22). The shafts 218 and 224 are rotatable and keyed to the movable gripper elements whereby the grippers are opened and closed by rotation of these shafts.

If cases of a single size were to be made, both the front and rear grippers could be carried on a single chain, but they are carried on separate chains, adjustable relative to each other, so that their spacing may be changed to carry cases of different sizes. The means for adjusting this spacing will now be described.

Shaft 206 carries on its end a bevel gear 231 meshing with a second bevel gear 232 carried by a short shaft 234 rotatably supported in bearings 235 and 236. Mounted on the end of shaft 234 is a collar 238 with a toothed flange 239 in engagement with a small pinion 240 carried by shaft 241 which is rotatably supported in a collar 242 secured by bolts 244 to a second collar 245 fast on shaft 246. The spacing is such that collar 242 clamps flange 239 in fixed position when bolts 244 are tightened. Shaft 246 drives shaft 208 through the pair of bevel gears 248 and 249. Pinion shaft 241 has a squared end 250 by which the pinion 240 can be rotated. By loosening the bolts 244 and rotating the pinion the relationship between the shafts 234 and 236 may be changed and this in turn, by changing the relative positions of the inner and outer chains 211 and 215, will alter the spacing between the front edge and rear edge grippers.

Referring to Figs. 8, 21 and 22, the shafts 218 and 224 which carry the movable halves of the grippers carry, adjacent the inner faces of their supporting yokes, actuating arms 251 having rollers 252 which engage the hubs of the four inner sprockets 209 and 210 to open the grippers as shown in dotted lines in Fig. 21. Thus the grippers come up around the rearmost sprockets in open condition, as may be seen in Fig. 8, to receive the partly finished case emerging from the rollers 55 and 56, closing thereon as soon as they move beyond the sprocket hubs. Similarly the rear grippers come up behind the forwardly moving case in open position and close around its rear edge.

Figures 17, 18, 19, 20:
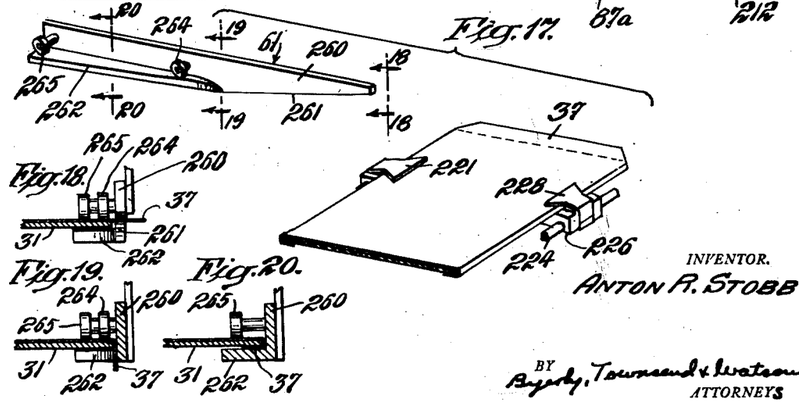
Fig. 17 is a somewhat diagrammatic perspective view of part of a case and one of the stationary formers which fold a side marginal portion of the covering.
Fig. 18 is an end elevation taken on the line 18—18 of Fig. 17 showing a fragment of the case just before the side marginal portion is folded downwardly by the stationary former.
Fig. 19 is a similar view after said portion has been folded downwardly and taken on the line 19—19 of Fig. 17.
Fig. 20 is a similar view showing said portion completely folded around the edge of the core and taken on the line 20—20 of Fig. 17.
Figure 25:
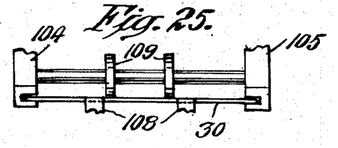

The case is thus carried forward with its side margins 37 and 38 extending outwardly. Arranged in alignment with the side edges of the core elements are the stationary side formers 61 (Fig. 17) which have flat vertical side faces 260, downwardly sloping bottom faces 261 and wedge-shaped inwardly facing extensions 262, the upper faces of which are at right angles to the vertical faces 260. Above the extensions 262 are pressing rollers 264 and 265, the latter being spaced further from the vertical face 260 than the former. The folding operations performed on one of the marginal side portions 37 of the covering 34 as the case advances are shown progressively in Figs. 18, 19 and 20 from which it will be seen that the flap 37 is first forced downwardly by face 261 and then upwardly by the wedge-shaped end of extension 262 so that it is completely folded underneath the edge of the core element and pressed thereon by the rollers 264 and 265. This finishes the formation of the case which then passes between the final pressure rollers 62 and 64. These rollers may be resiliently urged toward one another and preferably the lower rollers are metal and the upper rollers of some yielding material such as rubber.

*Drive system*

Figure 28:
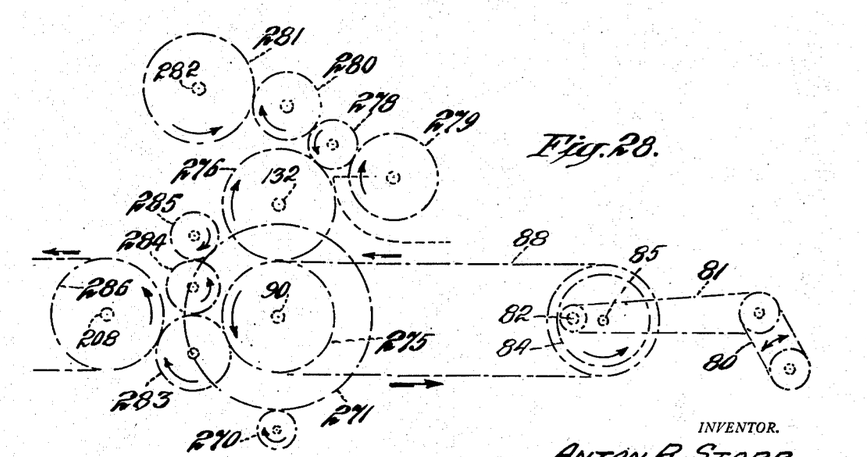
Fig. 28 is a diagram of the principal part of the drive system for the machine.

Referring principally to Fig. 28 and to other figures as indicated, power is supplied to a main drive pinion 270 driving a large gear 271 (Fig. 11) fast on the shaft 90 which carries lower cylindrical segment 46. On the other end of shaft 90 is multiple drive pulley 272 which is belt driven from a motor (not shown) and equipped with a hand wheel 274. The shafts 90 and 132, for the lower and upper segments respectively, have intermeshing gears 275 and 276. Gear 276 drives a gear 278 on the shaft of glue applying roller 54 which meshes with a gear 279 on the shaft of glue reservoir roller 52 and with an intermediate gear 280 driving gear 281 on the shaft 282 (Fig. 26) of the covering feeding mechanism cams 136 and 156. Gear 275 on the lower segment shaft 90 also drives an intermediate gear 283 which drives gears 284 and 285, on the pressure rollers 56 and 55 respectively, as well as gear 286 (Fig. 10) on front conveyor shaft 208. The final pressure rollers 62 and 64 are driven by intermediate gearing (not shown) from a gear 288 (Fig. 10) on shaft 206. Pusher mechanism 42 (Fig. 1) is driven, as previously described from shaft 85 (Fig. 11) which is driven by the chains 88.

*Operation*

While it is believed that the operation of the machine will be understood from the foregoing description a brief summary may be useful to a better understanding of the invention.

Referring to Fig. 1, the precut core elements are stacked in the hoppers at the right of the machine, the glue reservoir 51 is filled to the desired level with a suitable fluid adhesive and covering sheets are laid on the conveyor 48 in overlapping relationship with the forward edge of the most advanced cover in contact with the stop 151. The construction of the machine and the gear ratios of the various drive elements determine the timing of the operations which all take place automatically. When the machine is started, pushers 70 advance a set of core elements which are engaged by the pin arms 91 and carried toward the cylindrical segments 45 and 46. At the same time the transfer mechanism 49 picks up a covering sheet and feeds it to the grippers 50 of upper segment 45 which carries it around past the glue roller 54 by which the entire surface of the covering is coated with adhesive. As the core elements advance toward the segments, the covering 34 is progressively laid over their upper surfaces. As they pass between the segments, the front flap 35 of the covering is first folded downwardly by the front edge folding plate 170 and finally pasted up underneath the edge of the core elements by the combined action of the air blasts from pipes 180 and the pressing effect of rollers 55 and 56. Valve 69 is actuated, after this operation is performed, to shut off the air flowing through pipes 180. As the rear edges of the core elements pass between the segments the rear flap 36 is folded downwardly by the rear edge folding plate 181 and folded forwardly by the tail sweep plate 190. Emerging from rollers 55 and 56, the front edge of the case is gripped by front gripping elements 58 as they come up around the right hand sprocket of conveyor 60, and as the rear edge of the case reaches this point, it is taken by the rear edge grippers 59. In passing between the stationary edge formers 61, the side flaps 37 and 38 are simultaneously folded down and under the core elements and preliminarily pressed by the rollers 264 and 265. As the front edge grippers 58 pass down around the left hand sprockets of conveyor 60, they release the case which moves between the final pressing rollers 62 and 64, and after it has been gripped by these rollers, it is released by the rear edge grippers 59. Thus, the entire operation is performed in straight line production with continuous motion at uniform speed which enables the rate of production to be greatly increased over previously known procedures.

It is to be understood that the machine above described is merely illustrative of the invention which is not limited thereto but is to be construed broadly within the scope of the appended claims.

I claim:

1. A machine for making cases for books from core elements and covering therefor comprising, conveyor means for continuously advancing said elements at uniform speed, a pair of rotating cylindrical segments between which said elements pass at said speed, means for feeding covering sheets to the upper segment for application thereby to the top faces of said elements, a front edge fold plate moving with said upper segment and actuated to fold down the front edge of the covering as it emerges from between said segments, a rear edge fold plate moving with said upper segment and actuated to fold down the rear edge of the covering as it emerges from between said segments, and a sweep plate moving with said lower segment and actuated to fold the rear edge of the covering upwardly against the under side of the core elements, said sweep plate moving in the same direction as said elements but at greater speed.

2. A machine for making cases for books from core elements and covering therefor comprising, conveyor means for continuously advancing said elements in one direction at uniform speed, a pair of rotating cylindrical segments between which said elements pass in frictional engagement therewith, said segments being arranged one above the other, means for feeding covering sheets to the upper segment for application thereby to the top faces of said elements as they pass between the segments, a front edge fold plate moving with said upper segment and actuated to fold down the front edge of the covering as it emerges from between said segments, a rear edge fold plate moving with said upper segment and actuated to fold down the rear edge of the covering as it emerges from between said segments, a sweep plate moving with said lower segment and actuated to fold the rear edge of the covering upwardly against the under side of the core elements, and a pair of pressure rolls arranged to receive the cases from said segments.

3. A machine for making cases for books from core elements and covering therefor comprising, conveyor means for continuously advancing said elements at uniform speed, a pair of rotating cylindrical segments between which said elements pass at said speed, means for feeding covering sheets to the upper segment for application thereby to the top faces of said elements, a front edge fold plate moving with said upper segment and actuated to fold down the front edge of the covering as it emerges from between said segments, a rear edge fold plate moving with said upper segment and actuated to fold down the rear edge of the covering as it emerges from between said segments, a sweep plate moving with said lower segment and actuated to fold the rear edge of the covering upwardly against the under side of the core elements, a pair of pressure rolls to receive the cases from said segments, second conveyor means having grippers to take the cases by their front and rear edges as they move from said feed rolls, and stationary edge folders aligned with the side edges of said elements to fold the side cover margins down and under the same as they move with said second conveyor.

4. A machine for making cases for books from core elements and covering therefor comprising, a first conveyor means for continuously advancing said elements at uniform speed, a pair of rotating cylindrical segments between which said elements pass at said speed arranged one above the other, means for applying covering sheets to the core elements as they are advanced, means carried by one of the cylindrical segments adapted to fold the front edge of the covering across the front edge of each core element as it emerges from between said segments, means carried by one of said segments adapted subsequently to fold the rear edge of the covering across the rear end of each core element, means for folding the transversely folded front edge of the covering upwardly against the underside of the core element, means moving in the same direction as the core elements but at a greater speed for folding the transversely folded rear margins of the coverings against the undersurfaces of the core elements as it emerges from between said segments, means adapted thereafter to fold the rear edge of the covering upwardly against the under side of the core elements, second conveyor means adapted to receive the cases from said segments, and stationary edge folders aligned with the side edges of said elements to fold the side cover margins down and under the same as they move with said second conveyor means, said first and second conveyor means advancing the case elements throughout at a uniform speed in a single direction.

5. A machine for making cases for books from core elements and covering therefor comprising, conveyor means for continuously advancing said elements in one direction at uniform speed, a pair of rotating cylindrical segments between which said elements pass at said speed arranged one above the other, means for feeding covering sheets to the upper segment for application thereby to the top faces of said elements, means for coating said sheets with adhesive while being moved by said upper segment toward said elements, a front edge fold plate moving with said upper segment and actuated to fold down the front edge of the covering as it emerges from between said segments, a rear edge fold plate also moving with said upper segment and actuated to fold down the rear edge of the covering as it emerges from between said segments, a tail sweep plate moving with said lower segment and actuated to fold the rear edge of the covering upwardly against the under side of the core elements, a pair of pressure rolls to receive the cases from said segments, second conveyor means having grippers to take the cases by their front and rear edges as they move from said pressure rolls, stationary edge folders aligned with the side edges of said elements to fold the side cover margins down and under the same as they move with said second conveyor, and delivery rolls adapted to receive and press the case as it is released from the second conveyor.

6. In a case making machine, in combination, a pair of rotating cylindrical segments between which assembled core and covering elements of a case are fed, a pair of pressure rolls into the bight of which said elements move from said segments, a front edge folding plate pivotally supported on one of said segments, cam means actuating said plate to momentarily extend it beyond the periphery of its segment as the front edge of said case emerges from between the segments to fold an extending marginal portion of said covering over the front edge of said core, and means for directing said marginal portion backwardly around the edge of the core as it enters the bight of said pressure rolls.

7. In a case making machine, in combination, a pair of rotating cylindrical segments between which assembled core and covering elements of a case are fed, a pair of pressure rolls between which said elements move from said segments, a front edge folding plate pivotally supported on one of said segments, cam means actuating said plate to momentarily extend it beyond the periphery of its segment as the front edge of said case emerges from between the segments to fold an extending marginal portion of said covering over the front edge of said core, and means for directing a blast of air against said folded marginal portion as it moves toward said pressure rolls to deflect it toward a face of said core.

8. In a case making machine, in combination, a pair of rotating cylindrical segments between which assembled core and covering elements of a case are fed, a rear edge folding plate pivotally supported on one of said segments, cam means actuating said plate to momentarily extend it beyond the periphery of its segment as the rear edge of said case emerges from between the segments to fold an extending marginal portion of said covering over the rear edge of said core, a tail sweep plate pivotally mounted on the other of said segments, and cam means actuating said sweep plate to project it momentarily beyond the periphery of its segment to move it against said marginal portion at a speed in excess of its speed of travel to fold it flat against said core.

9. In a case making machine, in combination, a pair of rotating cylindrical segments arranged one above the other and between which assembled core and covering elements of a case are fed, a rear edge folding plate pivotally supported on the upper segment, cam means actuating said plate to momentarily extend it beyond the periphery of said upper segment as the rear edge of said case emerges from between the segments to fold an extending marginal portion of said covering downwardly over the rear edge of said core, a tail sweep plate pivotally mounted on the lower segment, and cam means actuating said sweep plate to project it beyond the periphery of its segment to move it forwardly against said marginal portion at a speed in excess of its speed of travel to fold it upwardly against said core.

10. In a case making machine having means for advancing core elements having a covering thereon with extending marginal portions and means for folding said portions downwardly over the front and rear edges of said elements, means for folding the rearmost folded marginal portion upwardly against the core elements as they advance, said means comprising a rotating member positioned beneath the path of the case, a shaft carried by said member, a stationary cam, a cam following arm on said shaft, links fixed on said shaft, a tail sweep plate pivotally supported on said links, a cam face on said rotatable member and a cam following arm rigidly connected with said plate adapted to ride along said cam face as said links are moved by said stationary cam, whereby said plate is projected in a forward direction during the rotation of said rotating member.

11. In a case making machine, in combination, a pair of rotating cylindrical segments arranged one above the other and adapted to feed assembled core and covering elements of a case by engagement therewith, said covering having front and rear marginal portions extending beyond the core, front and rear edge folding plates pivotally supported on the upper segment, cam means actuating said plates sequentially to momentarily extend each of them beyond the periphery of said upper segment as the front and rear edges respectively of said case emerge from between said segments to fold said marginal portions over the front and rear edges of said core, a tail sweep plate pivotally mounted on the lower segment, and cam means actuating said sweep plate to project it beyond the periphery of said lower segment to move it against said rear marginal portion after it has been folded over the rear edge of the core at a speed in excess of its speed of travel to fold it against the underside of said core.

12. In a case making machine, in combination, a pair of rotating cylindrical segments arranged one above the other and adapted to feed assembled core and covering elements of a case by engagement therewith, said covering having marginal portions extending beyond the core, front and rear edge folding plates pivotally supported on the upper segment, cam means actuating said plates sequentially to momentarily extend each of them beyond the periphery of said upper segment as the front and rear edges respectively of said case emerge from between said segments to fold the extending marginal portions of said covering over the front and rear edges of said core, a tail sweep plate pivotally mounted on the lower segment, cam means actuating said sweep plate to project it beyond the periphery of said lower segment to move it against the marginal portion of said cover folded over the rear edge of the core at a speed in excess of its speed of travel to fold it against the underside of said core, and a pair of pressure rolls arranged to receive the core between them as it moves from said segments to flatten the thus folded marginal portions against said core elements.

13. In a machine for making cases for books from board-like cores and fabric-like covers therefor, the combination of means for moving cores continuously forward at a constant speed in a single direction, means for moving covers at the same speed and in the same direction and applying them to one surface of the cores with margins extending beyond the edges of each core, and means for folding the rear margins of the covers around the receding rear edges of the moving cores including an element moving forward in the same direction as the cores but at a greater speed.

14. In a machine for making cases for books from board-like cores and fabric-like covers therefor, the combination of means for moving cores continuously forward at a constant speed in a single direction, means for moving covers at the same speed and in the same direction and applying them to one surface of the cores with margins extending beyond the edges of each core, means moving in the same direction and at the same speed as the cores for folding the rear margin of each cover across the receding rear edge of its core, and means moving forward in the same direction as the cores but at a greater speed for folding the receding transversely folded rear margins of the covers against the faces of the cores.

15. A machine for making cases for books from core elements and coverings therefor having marginal portions to be folded around said edges of said elements, comprising, in combination, means for moving the core elements forward continuously at a constant speed in a straight line path, means for moving the coverings at the same speed and in the same direction and applying them to the top surface of the core elements with extended margins, two folding means located above the path of movement of the core elements and moved forward at the same speed and in the same direction as the core elements, means for intermittently moving said folding means across the path of movement of the core elements to fold the front and rear margins of the covers across the front and rear edges of the moving core elements, means located under the path of the core elements for folding the advancing transversely folded front margins against the undersurface of the moving core elements, means located under the path of the core elements and moved forward in the same direction as the core elements but at a greater speed for folding the receding transversely folded rear margins of the covers against the undersurfaces of the moving core elements, and stationary folding means located at the sides of the path of the core elements for folding the two side margins of the covers around the side edges of the moving core elements.

16. A machine for making cases for books from core elements and coverings therefor, comprising conveying means for advancing the core elements at a uniform speed and in a single direction, means for moving coverings at the same speed and in the same direction and applying them to upper surfaces of the core elements with margins extending beyond the front and rear edges of the core elements, a front edge fold plate moving at the same speed as the core elements and actuated to fold down the front edge of the covering of each moving core element, a rear edge fold plate moving at the same speed and in the same direction as the core elements and actuated to fold down the rear edge of the covering on each moving core element, and a sweep plate moving in the same direction as the core elements but at a greater speed to fold the rear edges of the coverings upwardly against the underside of the core elements.

17. A machine for making cases for books from core elements and coverings therefor, comprising, in combination, means for moving the core elements continuously at a constant speed and in a single direction, means for moving coverings at the same speed and in the same direction and applying them to the upper surfaces of the core elements with margins extending beyond the front and rear edges of the core elements, a front edge fold plate to fold the front margin of each covering, a rear edge fold plate to fold the rear margin of each covering, a sweep plate to fold the rear margin of each covering against the underside of its core element, means for moving said fold plates in the same direction and at the same speed as the core elements, and means for moving the sweep plate in the same direction as the core elements but at a greater speed.

ANTON R. STOBB.

References Cited in the file of this patent

UNITED STATES PATENTS

| Number | Name | Date |
|---|---|---|
| 330,303 | Durkee | Nov. 10, 1885 |
| 490,895 | Bredenberg | Jan. 31, 1893 |
| 513,453 | Coles | Jan. 23, 1894 |
| 580,111 | Jacobs | Apr. 6, 1897 |

FOREIGN PATENTS

| Number | Country | Date |
|---|---|---|
| 754,434 | Germany | Aug. 2, 1951 |